(12) United States Patent
Yiu et al.

(10) Patent No.: US 11,082,901 B2
(45) Date of Patent: Aug. 3, 2021

(54) SIGNALING OF SUPPORT FOR NETWORK CONTROLLED SMALL GAP, NCSG, FOR INTERRUPTION CONTROL

(71) Applicant: Apple Inc., Cupertino, CA (US)

(72) Inventors: Candy Yiu, Portland, OR (US); Yang Tang, Pleasanton, CA (US); Rui Huang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/339,500

(22) PCT Filed: Nov. 1, 2017

(86) PCT No.: PCT/US2017/059609
§ 371 (c)(1),
(2) Date: Apr. 4, 2019

(87) PCT Pub. No.: WO2018/085459
PCT Pub. Date: May 11, 2018

(65) Prior Publication Data
US 2020/0045600 A1    Feb. 6, 2020

Related U.S. Application Data

(60) Provisional application No. 62/417,702, filed on Nov. 4, 2016.

(51) Int. Cl.
*H04W 36/00* (2009.01)
*H04W 76/27* (2018.01)
(Continued)

(52) U.S. Cl.
CPC ....... *H04W 36/0094* (2013.01); *H04W 24/10* (2013.01); *H04W 36/0088* (2013.01); *H04W 36/30* (2013.01); *H04W 76/27* (2018.02)

(58) Field of Classification Search
CPC . H04W 36/0094; H04W 76/27; H04W 24/10; H04W 36/0088; H04W 36/30
See application file for complete search history.

(56) References Cited

U.S. PATENT DOCUMENTS

| | | | |
|---|---|---|---|
| 2011/0200014 A1* | 8/2011 | Lee ................... | H04W 36/0085 370/332 |
| 2012/0178465 A1* | 7/2012 | Lin ...................... | H04W 24/10 455/450 |

(Continued)

FOREIGN PATENT DOCUMENTS

| | | |
|---|---|---|
| WO | 2015170579 A1 | 11/2015 |
| WO | 2016164782 A1 | 10/2016 |

OTHER PUBLICATIONS

International Search Report and Written Opinion dated Jan. 11, 2018 for PCT Application PCT/US2017/059609.

*Primary Examiner* — Pao Sinkantarakorn
*Assistant Examiner* — Kabir U Jahangir
(74) *Attorney, Agent, or Firm* — Eschweiler & Potashnik, LLC

(57) ABSTRACT

NCSGs may be used by a cellular network to, for example, enhance the signal measurement processes by which a UE performs inter-frequency measurements. In a first embodiment described herein, a UE may signal to the network, on a per-UE basis, the ability to support NCGS interruptions. In a first embodiment described herein, a UE may signal to the network, on a per-component carrier basis of the UE, the ability to support NCGS interruptions.

22 Claims, 9 Drawing Sheets

(51) Int. Cl.
*H04W 24/10* (2009.01)
*H04W 36/30* (2009.01)

(56) References Cited

U.S. PATENT DOCUMENTS

| | | | | |
|---|---|---|---|---|
| 2015/0215803 | A1* | 7/2015 | Huang | H04W 24/10 370/241 |
| 2015/0245235 | A1* | 8/2015 | Tang | H04W 36/0011 370/252 |
| 2016/0337893 | A1* | 11/2016 | Gheorghiu | H04W 24/10 |
| 2017/0064578 | A1* | 3/2017 | Takahashi | H04W 8/22 |

* cited by examiner

SIGNALING OF SUPPORT FOR NETWORK CONTROLLED SMALL GAP, NCSG, FOR INTERRUPTION CONTROL

RELATED APPLICATIONS

This application is a National Phase entry application of International Patent Application No. PCT/US2017/059609 filed Nov. 1, 2017, which claims priority to U.S. Provisional Patent Application No. 62/417,702, which was filed on Nov. 4, 2016, entitled "SIGNALING SUPPORT FOR NCSG FOR INTERRUPTION CONTROL" in the name of Candy Yiu et al. and is hereby incorporated by reference in its entirety.

BACKGROUND

Wireless cellular telecommunication networks include Radio Access Networks (RANs) that enable User Equipment (UE), such as smartphones, tablet computers, laptop computers, etc., to connect to a core network. An example of a wireless telecommunications network may include an Evolved Packet System (EPS) that operates based on 3rd Generation Partnership Project (3GPP) Communication Standards. In a cellular network, UEs typically communicate with base stations using radio channels corresponding to a licensed spectrum of radio frequencies.

UEs may measure the received power (signal quality) of the serving cell (i.e., the cell to which the UE is attached) and/or neighboring cells, and may report the measured values, in a measurement report, to the base station associated with the cell. Measuring the signal quality of cells that are using the same carrier frequency (intra-frequency measurements) is a relatively straight forward task. However, measuring the signal quality for neighboring cells (inter-frequency measurements) is more difficult, and may require the use of measurement gaps, in which a "gap" is scheduled at the serving cell in which the UE does not receive or transmit anything. During the gap, the UE may switch the carrier frequency to that of the target cell, perform the signal quality measurements, and then switch back to the frequency of the serving cell.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

NCSGs may be used by a cellular network to, for example, enhance the signal measurement processes by which a UE performs inter-frequency measurements. In a first embodiment described herein, a UE may signal to the network, on a per-UE basis, the ability to support NCGS interruptions. In a second embodiment described herein, a UE may signal to the network, on a per-component carrier basis of the UE, the ability to support NCGS interruptions.

Figure 1:
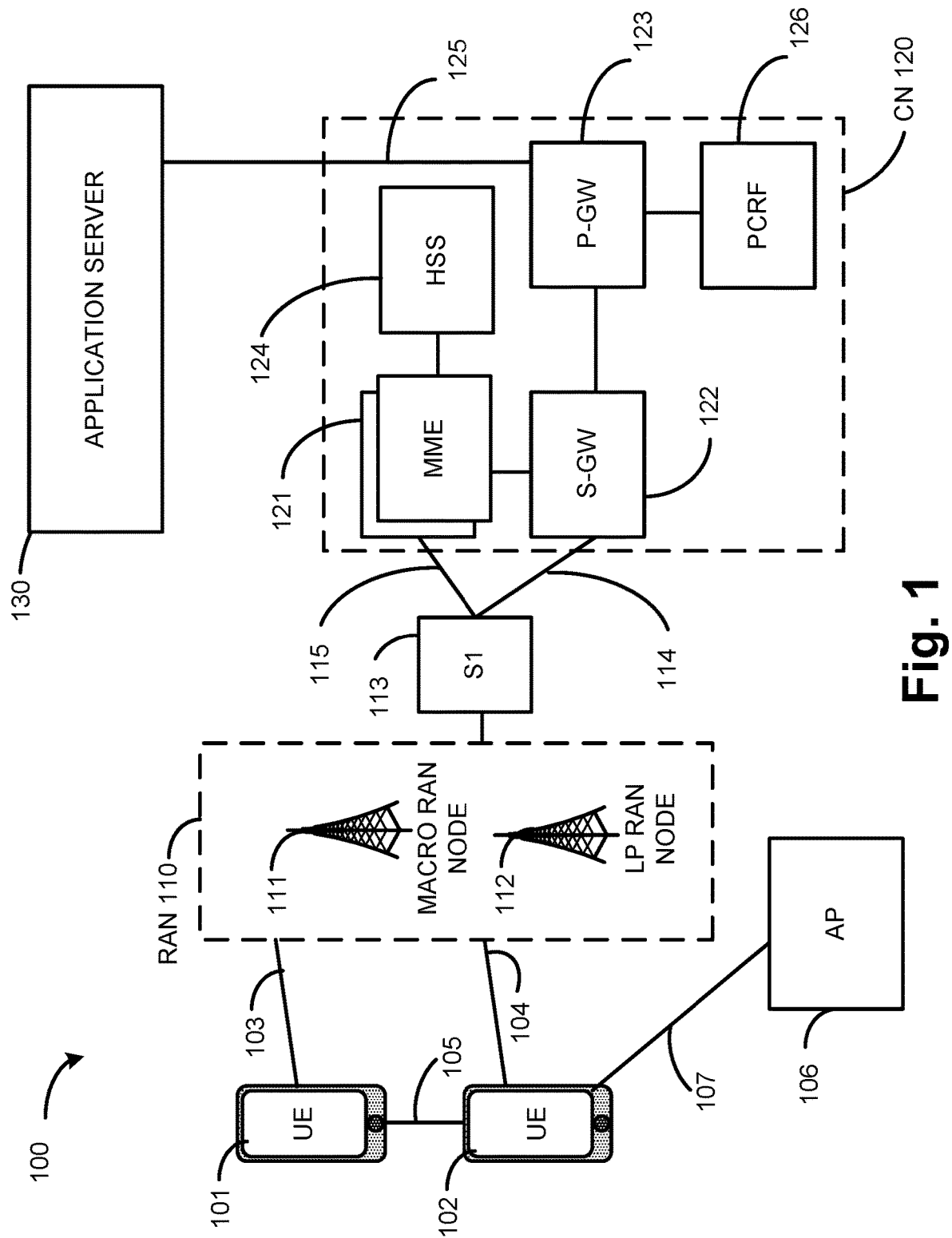
FIG. 1 illustrates an architecture of a system in accordance with some embodiments.

FIG. 1 illustrates an architecture of a system 100 in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125.

The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
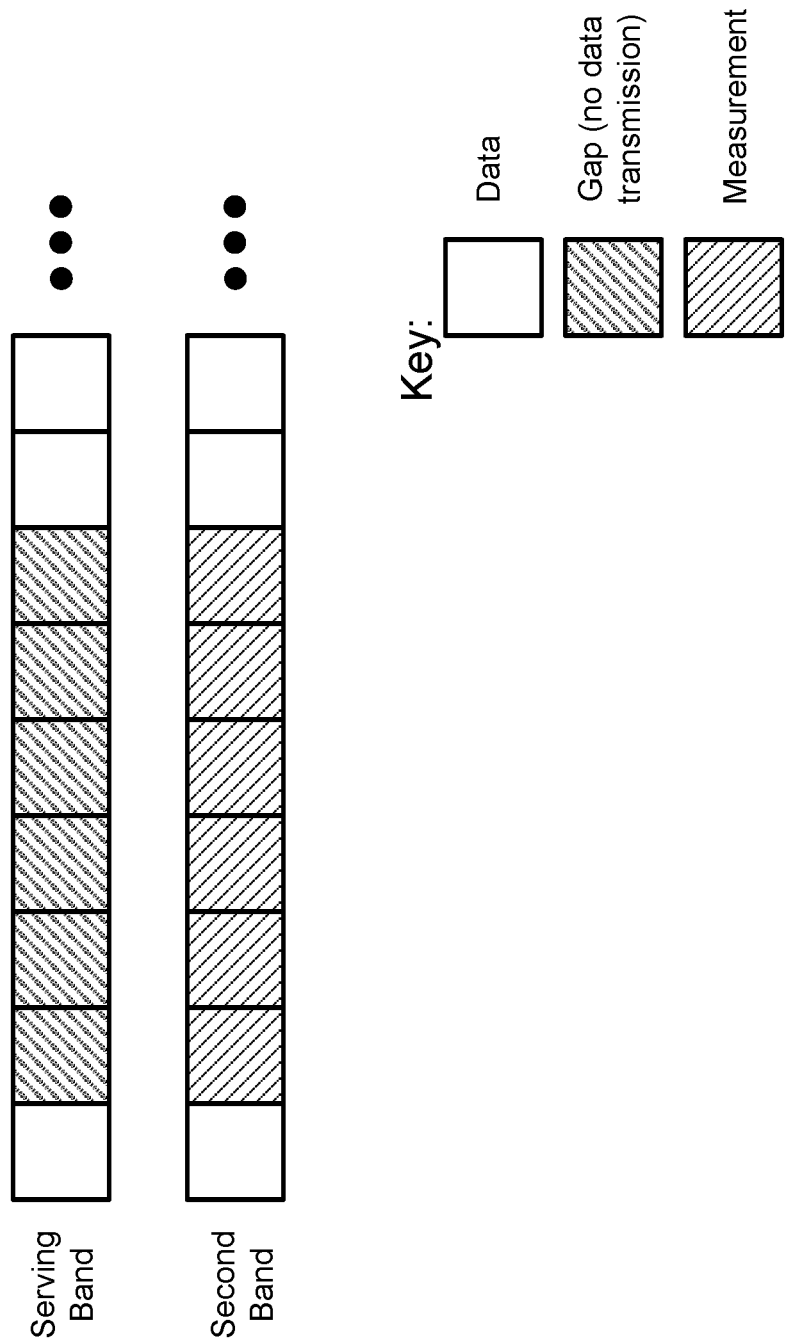
FIG. 2 is a diagram conceptually illustrating the use of measurement gaps by a UE.

FIG. 2 is a diagram conceptually illustrating the use of measurement gaps by a UE. In FIG. 2, communication subframes, such as 1 milli-second (ms) subframes, are illustrated for a serving band and a second band of a UE. The serving band may correspond to the frequency band that is currently being used by the UE in attaching to an eNB. The second band may correspond to a different frequency band, such as one that is being used by a neighboring cell, such as a neighboring cell provided by the same eNB to which the UE is attached or a different UE.

As shown in FIG. 2, the network and the UE may schedule a measurement gap ("Gap [no data transmission]") on the serving band. The measurement gap is shown in FIG. 2 in the second through the seventh subframe. During the measurement gap, the UE may switch frequency bands, to the second band, perform signal quality measurements relating to the second band, and then switch back to the serving band. The signal quality measurements may be transmitted, to the eNB, as part of a measurement report.

For some UEs, such as UEs that have multiple radio circuits or radio chains, and may thus be capable of concurrently communicating on multiple frequency bands, a conventional measurement gap, such as that shown in FIG. 2, may not be needed. For example, a UE with two radio circuits may not require measurement gaps. However, even though a UE with multiple radios may not require measurement gaps to perform measurements, communication gaps may still be used or needed in certain situations, such as to perform RF tuning in the physical layer. These short gaps may be scheduled by the network and may be referred to as Network Controlled Small Gap (NCSGs).

Figure 3:
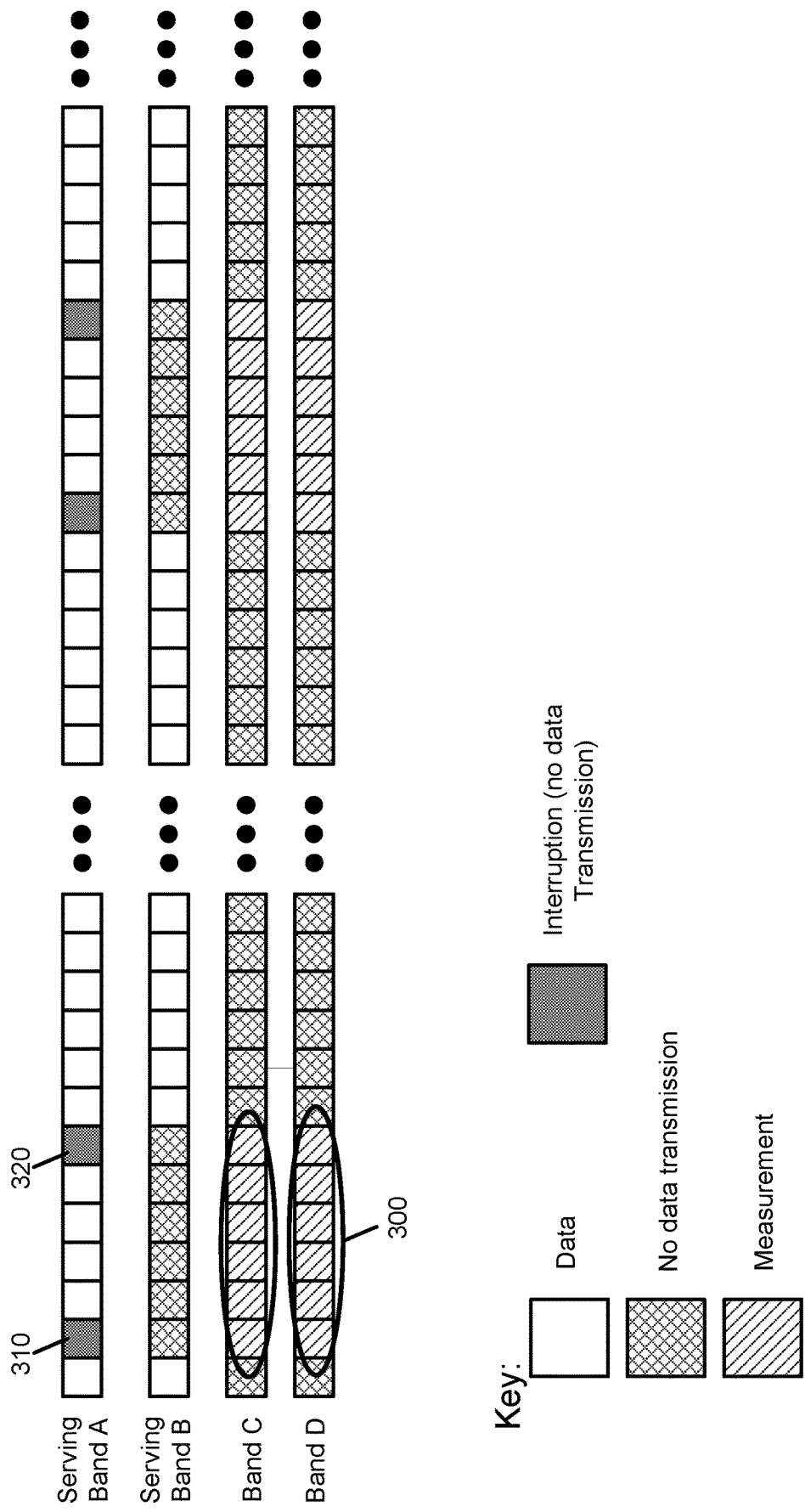
FIG. 3 is a diagram conceptually illustrating the use of Network Controlled Small Gaps (NCSGs) by a UE.

FIG. 3 is a diagram conceptually illustrating the use of NCSGs by a UE. In FIG. 3, assume that a UE includes two radios and can thus simultaneously attach to two serving bands, labeled as "Serving Band A" and "Serving Band B." Serving Band A and Serving Band B may correspond to, for example, cells associated with a single eNB or with 2 different eNBs. The UE would additionally like to perform measurements on bands C and D. Subframes 300, in bands C and D, may correspond to subframes in which the UE is performing signal quality measurements in these bands.

In the example of FIG. 3, during the measurement duration in Band D, a measurement gap is needed on Serving Band B. However, during the measurement duration, the UE may be capable of receiving data on Serving Band A while performing measurements on another band, such as Band C. The UE may be capable of receiving data on Serving Band A while performing measurements on band C due to the implementation of multiple RF chains (i.e., multiple, parallel, RF processing circuits). However, short interruptions (gaps), implemented as the NCSGs, may be needed to perform RF tuning on the band in which the full measurement gap is not used (e.g., Serving Band A). For example, as shown in FIG. 3, single subframe (e.g., 1 ms) interruptions, in which no data is transmitted, may be needed on Serving Band A before data can be transmitted or received during the measurement period on Band C. As is particularly shown in FIG. 3, for Serving Band A, a 1 ms NCSG (interruption) 310 is located in Service Band A (at the time corresponding to the beginning of the measurement period on band C) and a second 1 ms NCSG 320 is located in Serving Band A at the time corresponding to the end of the measurement period on band C. During NCSGs 310 and 320, RF tuning may be performed in Serving Band A.

Consistent with aspects described herein, to assist the network, such as eNB 111, to schedule measurement gaps, including NCSG interruptions, UE 101/102 may indicate, to the network, the measurement gap preference of the UE. In a first embodiment, NCSG may be configured on a per-UE basis, and the UE may indicate, as part of UE capability signaling, whether the UE supports NCSG.

Figure 4:
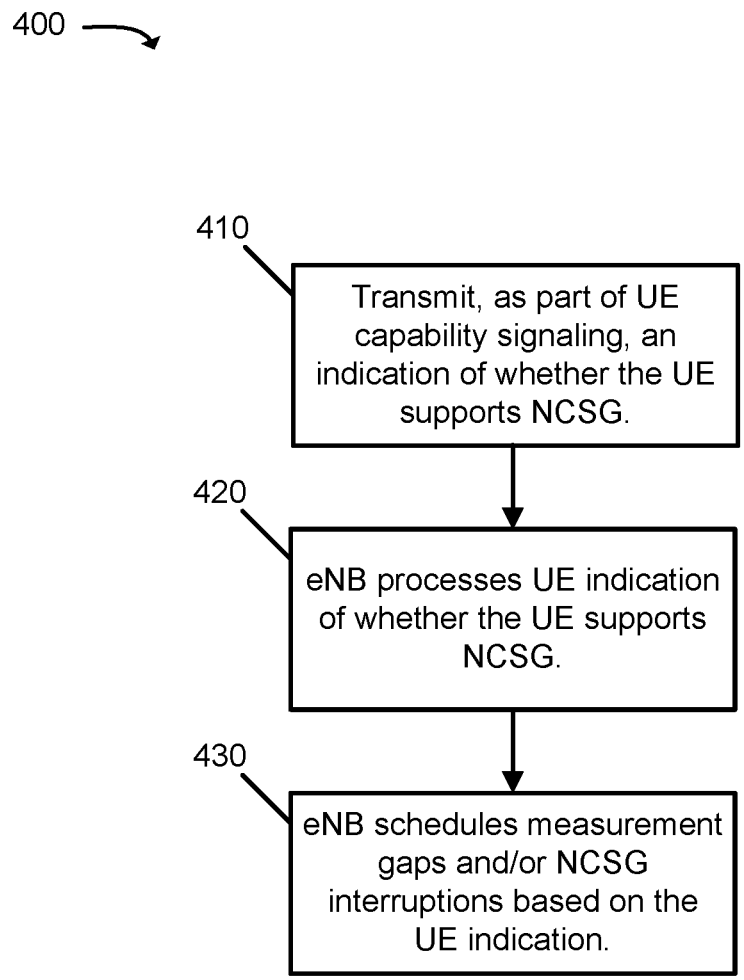
FIG. 4 is a flowchart illustrating an example process relating to control signaling for NCSG interruptions that are performed on a per-UE basis.

FIG. 4 is a flowchart illustrating an example of process 400 relating to control signaling for per-UE NCSG interruptions. Process 400 may be performed by, for example, UE 101 and eNB 111.

Process 400 may include transmitting, as part of UE capability signaling, an indication of whether the UE supports NCSG (block 410). The indication may apply on a per-UE basis. That is, the UE may support (or not support) NCSG on all component carriers of the UE.

In one possible embodiment, the indication of whether the UE supports NCSG may be transmitted as one or more Information Elements (IEs) that are transmitted as part of UE capability signaling. For example, the 3GPP UE-EUTRA-Capability IE data structure, which may be transmitted as RRC signaling, may be used. An example of such a data structure is shown in Table I, where bold text in Table I is used to illustrate features not in the existing 3GPP standards. In Table I, the field "ncsgNeedForInterruption" may indicate whether the UE can use NCSG for interruption control.

TABLE I

UE-EUTRA-Capability Information Element

| | | |
|---|---|---|
| UE-EUTRA-Capability-v1320-IEs ::= | SEQUENCE { | |
|     ce-Parameters-v1320 | CE-Parameters-v1320 | OPTIONAL, |
|     phyLayerParameters-v1320 | PhyLayerParameters-v1320 | OPTIONAL, |
|     rf-Parameters-v1320 | RF-Parameters-v1320 | OPTIONAL, |
|     fdd-Add-UE-EUTRA-Capabilities-v1320 | UE-EUTRA-CapabilityAddXDD-Mode-v1320 | OPTIONAL, |
|     tdd-Add-UE-EUTRA-Capabilities-v1320 | UE-EUTRA-CapabilityAddXDD-Mode-v1320 | OPTIONAL, |
|     nonCriticalExtension | UE-EUTRA-Capability-vxy-IEs | OPTIONAL |
| } | | |
| UE-EUTRA-Capability-vxy-IEs ::= | SEQUENCE { | |
|     measParameters-vxy |     MeasParameters-vxy OPTIONAL, | |
|     nonCriticalExtension |     SEQUENCE { } | OPTIONAL |
| } | | |
| MeasParameters-vxy ::= | SEQUENCE { | |
|     ncsgNeedForInterruption-r14 |     ENUMERATED {true} | OPTIONAL |
| } | | |

Process 400 may further include processing the UE indication of whether the UE supports NCSG (block 420) and scheduling measurements gaps and/or NCSG interruptions based on the UE indication (block 430). For example, when the UE supports NCSG interruptions, the NCSG interruptions may be scheduled, by eNB 111, to allow the UE to receive data via a serving cell while simultaneously measuring another band (e.g., as discussed for Serving Band A and Band C in FIG. 3).

Figure 5:
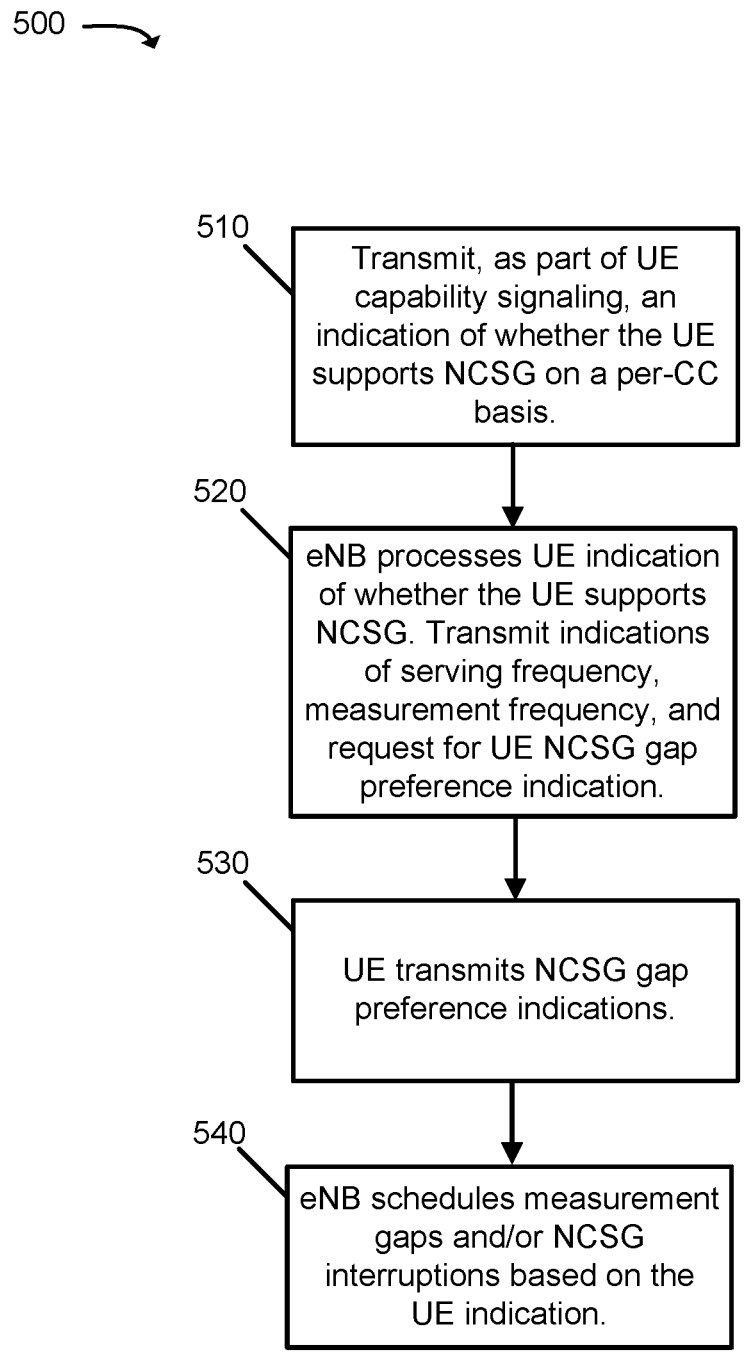
FIG. 5 is a flowchart illustrating an example process relating to control signaling for NCSG interruptions that are performed on a per-Component Carrier (per-CC) basis.

FIG. 5 is a flowchart illustrating an example process 500 relating to control signaling for NCSG interruptions that are per performed on a per-Component Carrier (per-CC) basis. A UE may implement multiple CCs. For example, UE 101 may include a number of radios and/or radio chains that allow the UE to concurrently communicate on multiple carriers. In one implementation, each component carrier may be associated with a serving cell (e.g., in the example of FIG. 3, the UE has two component carriers, associated with Serving Cell A and Serving Cell B). In per-CC NCSG. NCSG interruptions may be scheduled on a per-CC basis. Process 500 may be performed by, for example, UE 101 and eNB 111.

Process 500 may include transmitting, as part of UE capability signaling, an indication of whether the UE supports NCSG (block 510). The indication may be made on a per-CC basis. For example, the UE may indicate, for each CC, whether NCSG interruptions are supported.

Process 500 may further include processing the UE indication of whether the UE supports NCSG and, in response, transmitting, to the UE, indications of the serving frequency and measurement frequency for the UE (block 520). The eNB may also request that the UE respond with preference information indicating the UE's NCSG gap preference. The UE may transmit, to the eNB, the NCSG gap preference information (block 530). The information exchanged in blocks 520 and 530 may be on a per-CC basis. Process 500 may further include processing the UE indications and scheduling the measurement gaps and/or NCSG interruptions, on a per-CC basis (block 530). For example, when the UE supports NCSG interruptions, the NCSG interruptions may be scheduled to allow the UE to receive data via a serving cell while simultaneously measuring another band (e.g., as discussed for Serving Band A and Band C in FIG. 3). The NCSG interruptions, corresponding to different component carriers, may be scheduled at different times. The UE may perform RF tuning, on the serving band, during the NCSG interruptions.

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
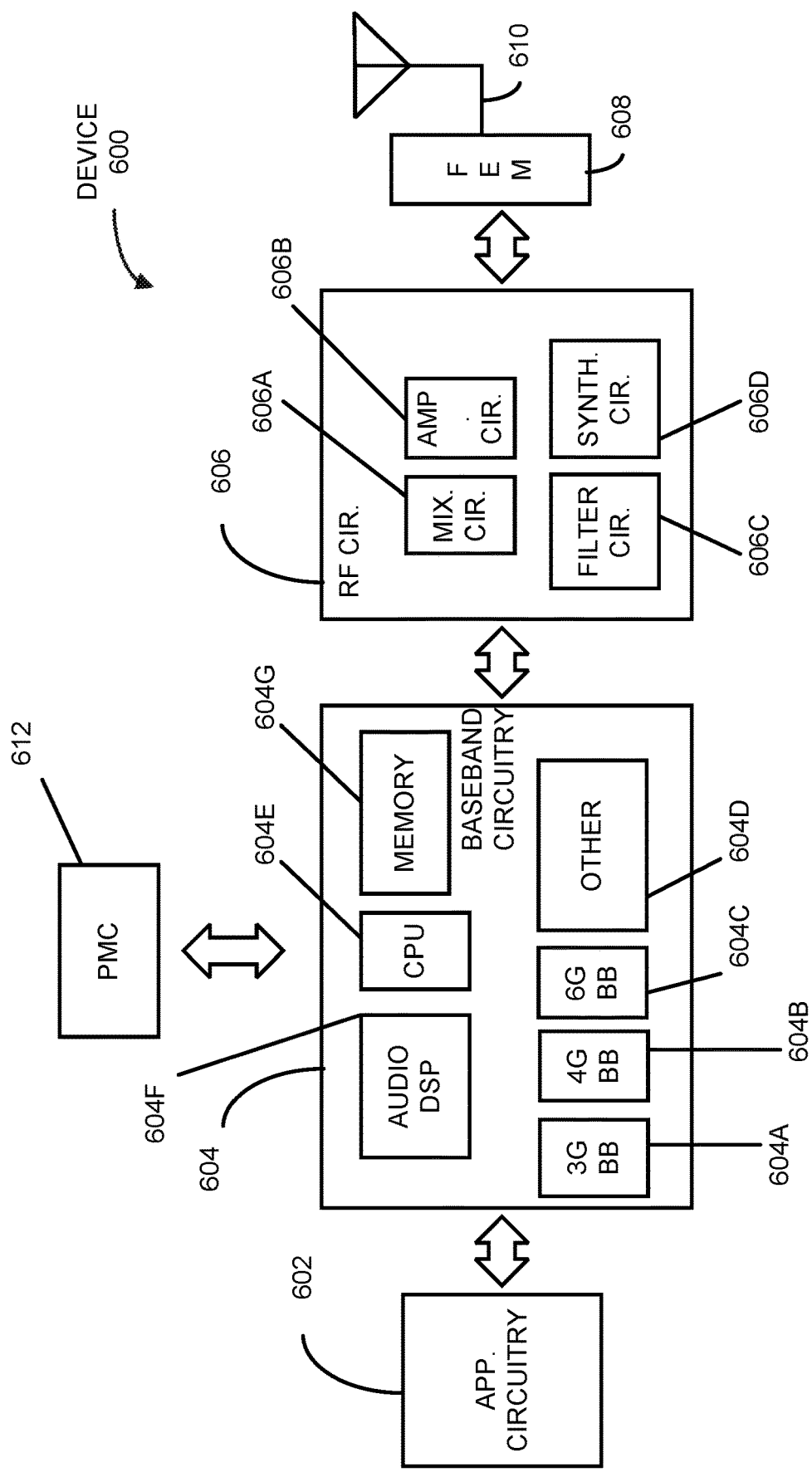
FIG. 6 illustrates example components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+(e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 6 12 may be additionally or alternatively coupled with, and perform similar power management operations for, other components such as, but not limited to, application circuitry 602. RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600) may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
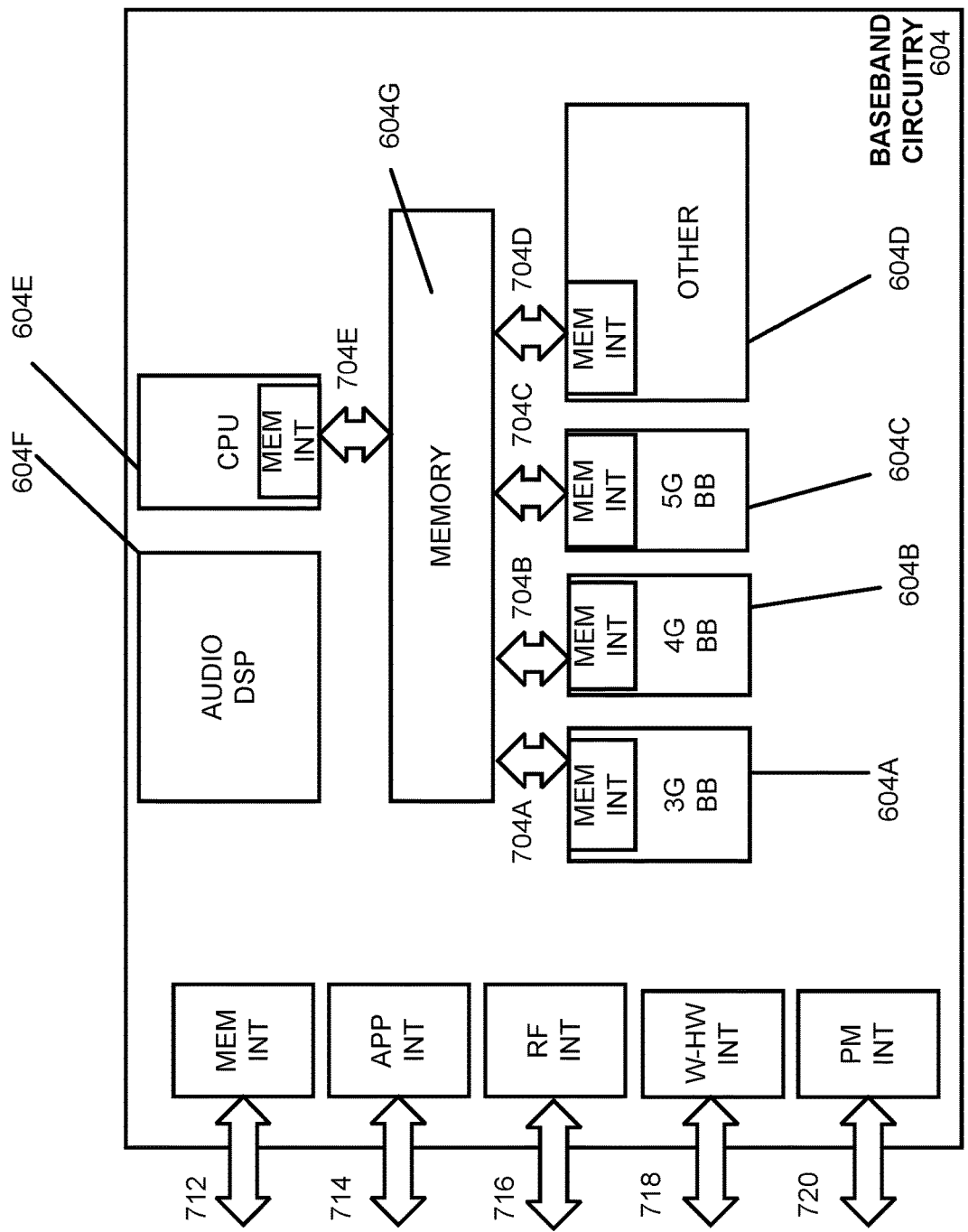
FIG. 7 illustrates example interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-504E and a memory 604G utilized by said processors. Each of the processors 604A-504E may include a memory interface, 704A-604E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy). Wi-Fi® components, and other communication components), and a power management interface 720 (e.g., an interface to send/receive power or control signals to/from the PMC 612. RF circuitry interface 716 may particularly include a first interface to a radio designed to communicate via an LTE link and a second interface to a radio designed to communicate via a WLAN (e.g., WiFi) link.

Figure 8:
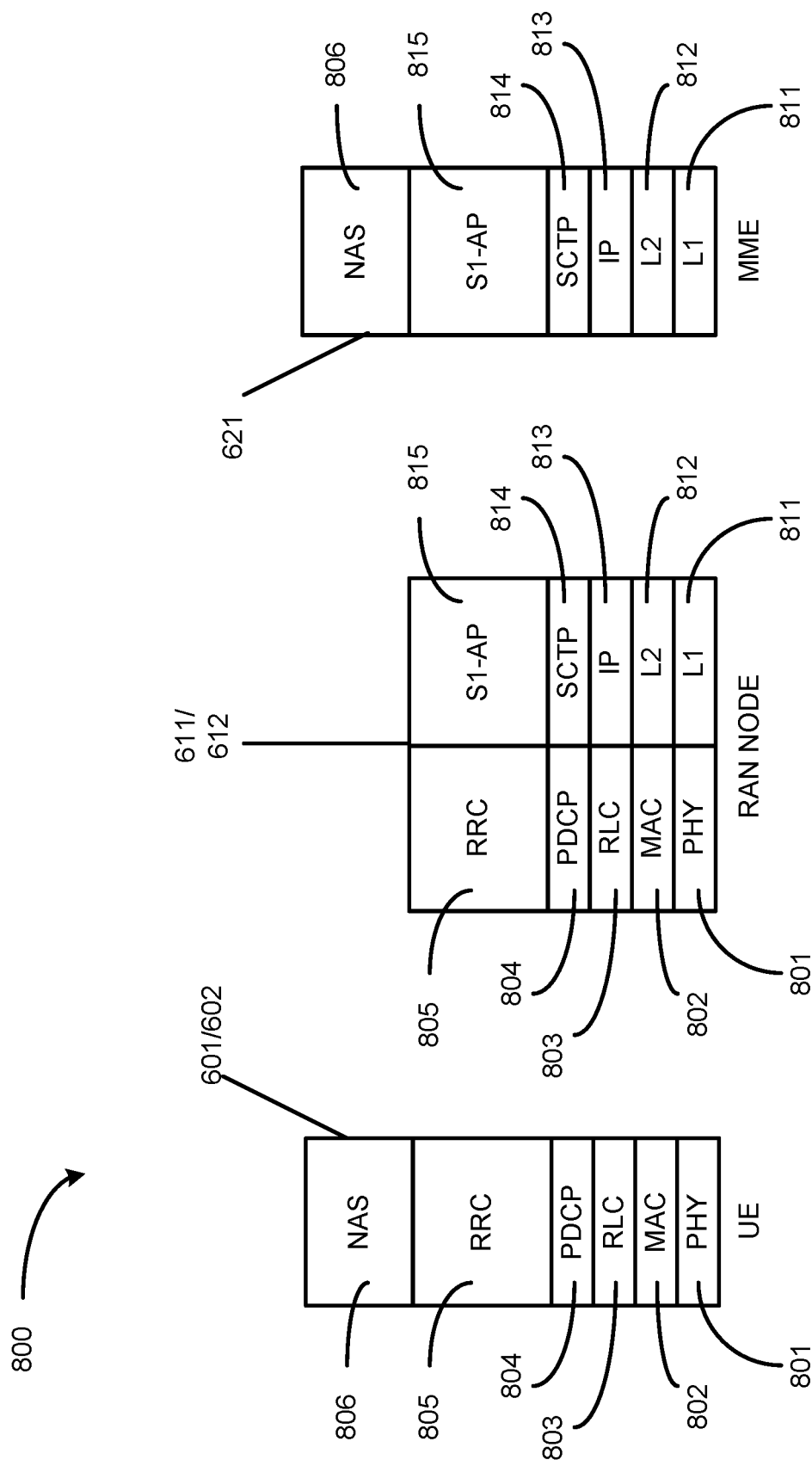
FIG. 8 is an illustration of a control plane protocol stack in accordance with some embodiments.

FIG. 8 is an illustration of a control plane protocol stack in accordance with some embodiments. In this embodiment, a control plane 800 is shown as a communications protocol stack between the UE 101 (or alternatively, the UE 102), the RAN node 111 (or alternatively, the RAN node 112), and the MME 121.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 101 and the MME 121. The NAS protocols 806 support the mobility of the UE 101 and the session management procedures to establish and maintain IP connectivity between the UE 101 and the P-GW 123.

The S1 Application Protocol (S1-AP) layer 815 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 111 and the MME 121 based, in part, on the IP protocol, supported by the IP layer 813. The L2 layer 812 and the L1 layer 811 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 811, the L2 layer 812, the IP layer 813, the SCTP layer 814, and the S1-AP layer 815. A number of examples, relating to implementations of the techniques described above, will next be given.

Figure 9:
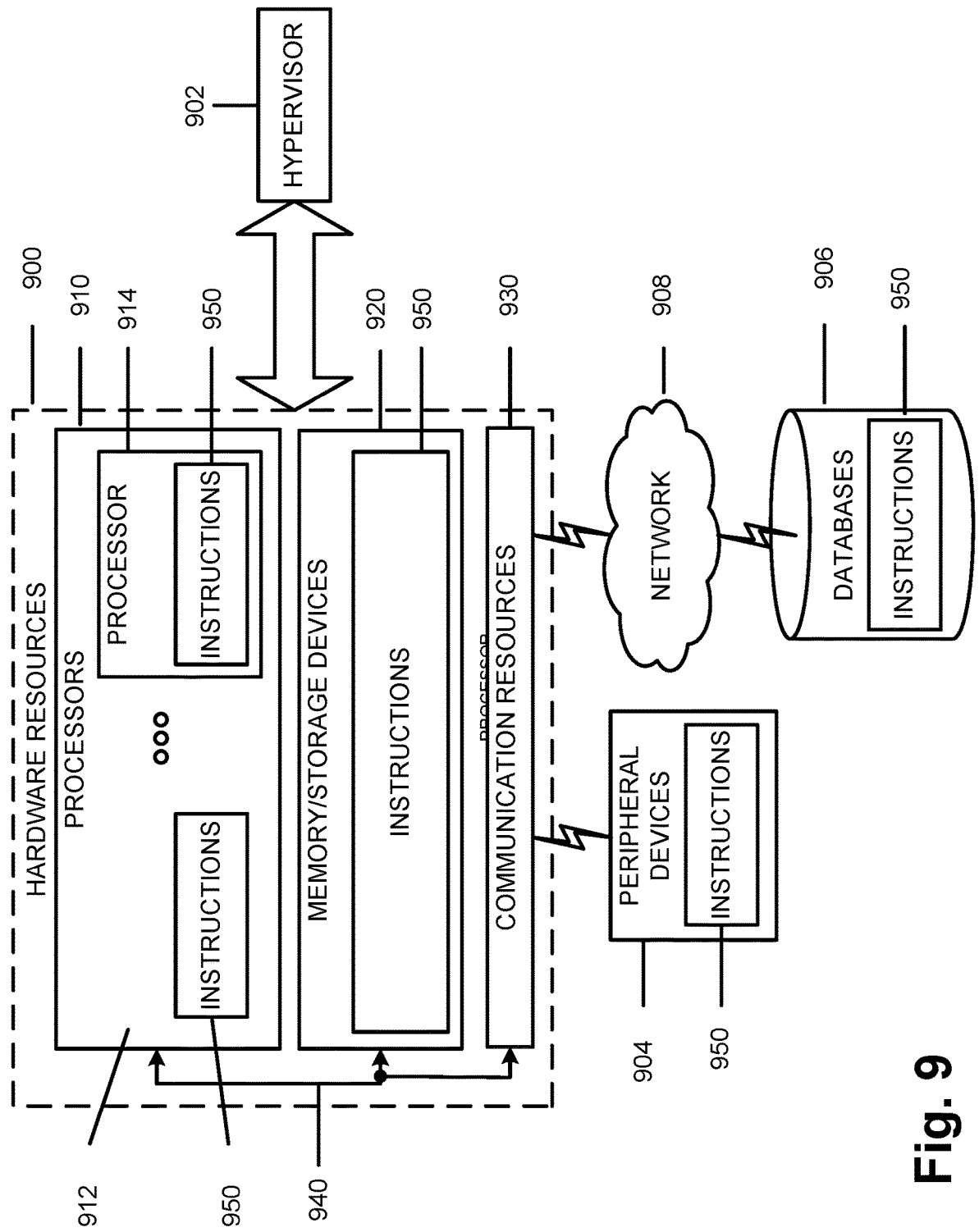
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

A number of examples, relating to implementations of the techniques described above, will next be given.

In a first example, an apparatus of a baseband processor for User Equipment (UE) may comprise: an interface to a radio circuit, for a cellular wireless network, the radio circuit concurrently implementing a plurality of component carriers for the wireless network; and one or more processors to: generate a message, as part of UE capability signaling, indicating whether the UE supports Network Controlled Small Gap (NCSG) interruptions, the message including independent indications of whether the UE supports NCSG for the different plurality of component carriers, process signaling from the cellular wireless network indicating when NCSG interruptions are scheduled; and perform signal quality measurements based on the scheduled NCSG interruptions.

In example 2, the subject matter of example 1, or any of the preceding examples, wherein the one or more processors are further to: refrain from transmitting or receiving data, for a particular component carrier of the plurality of component carriers, during a scheduled NCSG interruption.

In example 3, the subject matter of example 1 or 2, or any of the preceding examples, wherein the one or more processors are further to: control transmission of the message, to the wireless network, using Radio Resource Control signaling.

In example 4, the subject matter of example 1 or 2, or any of the preceding examples, wherein NCSG interruptions are scheduled at different times on different ones of the plurality of component carriers.

In example 5, the subject matter of example 1, or any of the preceding examples, wherein the one or more processors are further to: perform, during the NCSG interruptions, radio frequency (RF) tuning.

In example 6, the subject matter of example 1 or 5, or any of the preceding examples, wherein each of the plurality of component carriers is associated with a different Serving Cell of the wireless network.

In a seventh example an apparatus including User Equipment (UE) comprises a computer-readable medium containing program instructions; and one or more processors to execute the program instructions to: transmit a UE capability signaling message that indicates whether the UE supports Network Controlled Small Gap (NCSG) interruptions in a cellular wireless network to which the UE is attached, the message including a per-component carrier indication of whether the UE supports NCSG; process signaling from the cellular wireless network indicating when NCSG interruptions are scheduled; and perform signal quality measurements based on the scheduled NCSG interruptions.

In example 8, the subject matter of example 7, or any of the preceding examples, wherein the one or more processors are further to execute the program instructions to: refrain from transmitting or receiving data, for a particular component carrier of the plurality of component carriers, during a scheduled NCSG interruption.

In example 9, the subject matter of example 7 or 8, or any of the preceding examples, wherein the one or more processors are further to execute the program instructions to: control transmission of the message, to the wireless network, using Radio Resource Control signaling.

In example 10, the subject matter of example 7 or 8, or any of the preceding examples, wherein NCSG interruptions are scheduled at different times on different ones of the plurality of component carriers.

In example 11, the subject matter of example 7, or any of the preceding examples, wherein the one or more processors are further to execute the program instructions to: perform, during the NCSG interruptions, radio frequency (RF) tuning.

In example 12, the subject matter of example 7, or any of the preceding examples, wherein different component carriers are associated with a different Serving Cell of the wireless network.

In example 13, the subject matter of example 1 or 7, or any of the preceding examples, wherein the one or more processors are further to: process additional signaling, received from the cellular wireless network, indicating a serving frequency and a measurement frequency of cells associated with the cellular wireless network.

In example 14, the subject matter of example 13, or any of the preceding examples, wherein the one or more processors are further to: generate a second message, in response to the additional signaling, indicating UE preferences relating to the NCSG interruptions; and control transmitting of the second message via the radio circuit.

In a 15$^{th}$ example, an apparatus of a baseband processor for User Equipment (UE) may comprise an interface to radio circuitry, for a cellular wireless network; and one or more processors to: generate a message, as part of UE capability signaling, indicating whether the UE supports Network Controlled Small Gap (NCSG) interruptions; process signaling from the cellular wireless network indicating when NCSG interruptions are scheduled; and perform signal quality measurements based on the scheduled NCSG interruptions.

In example 16, the subject matter of example 15, or any of the preceding examples, wherein the one or more processors are further to: process additional signaling, received from the cellular wireless network, indicating a serving frequency and a measurement frequency of cells associated with the cellular wireless network.

In example 17, the subject matter of example 16, or any of the preceding examples, wherein the one or more processors are further to: generate a second message, in response to the additional signaling, indicating UE preferences relating to the NCSG interruptions; and control transmitting of the second message via the radio circuit.

In example 18, the subject matter of example 15, or any of the preceding examples, wherein the one or more processors are further to: refrain from transmitting or receiving data during a scheduled NCSG interruption.

In example 19, the subject matter of example 15, or any of the preceding examples, wherein the one or more processors are further to: control transmission of the message, to the wireless network, using Radio Resource Control signaling.

In example 20, the subject matter of example 15, or any of the preceding examples, wherein the one or more processors are further to: perform, during the NCSG interruptions, radio frequency (RF) tuning.

In a 21$^{st}$ example, an apparatus including User Equipment (UE) may comprise: a computer-readable medium containing program instructions; and one or more processors to execute the program instructions to: transmit a UE capability signaling message that indicates whether the UE supports Network Controlled Small Gap (NCSG) interruptions in a cellular wireless network to which the UE is attached; process signaling from the cellular wireless network indicating when NCSG interruptions are scheduled; and perform signal quality measurements based on the scheduled NCSG interruptions.

In example 22, the subject matter of example 21, or any of the preceding examples, wherein the one or more processors are further to execute the program instructions to: refrain from transmitting or receiving data, for a particular component carrier of the plurality of component carriers, during a scheduled NCSG interruption.

In example 23, the subject matter of example 21, or any of the preceding examples, wherein the one or more processors are further to execute the program instructions to: control transmission of the message, to the wireless network, using Radio Resource Control signaling.

In example 24, the subject matter of example 21, or any of the preceding examples, wherein the one or more processors are further to execute the program instructions to: perform, during the NCSG interruptions, radio frequency (RF) tuning.

In a 25$^{th}$ example a method implemented by User Equipment (UE) comprising: generating a message, as part of UE capability signaling, indicating whether the UE supports Network Controlled Small Gap (NCSG) interruptions, the message including independent indications of whether the UE supports NCSG for different ones of a plurality of component carriers that are used by a radio of the UE; processing signaling from the cellular wireless network indicating when NCSG interruptions are scheduled; and performing signal quality measurements based on the scheduled NCSG interruptions.

In example 26, the subject matter of example 25, or any of the preceding examples, wherein refraining from transmitting or receiving data, for a particular component carrier of the plurality of component carriers, during a scheduled NCSG interruption.

In example 27, the subject matter of example 25, or any of the preceding examples, wherein controlling transmission of the message, to the wireless network, using Radio Resource Control signaling.

In example 28, the subject matter of example 25, or any of the preceding examples, wherein NCSG interruptions are scheduled at different times on different ones of the plurality of component carriers.

In example 29, the subject matter of example 25, or any of the preceding examples, wherein the method may further include performing, during the NCSG interruptions, radio frequency (RF) tuning.

In example 30, the subject matter of example 25, or any of the preceding examples, wherein the method may further comprise processing additional signaling, received from the cellular wireless network, indicating a serving frequency and a measurement frequency of cells associated with the cellular wireless network.

In a 31$^{st}$ example, User Equipment (UE) may comprise means for generating a message, as part of UE capability signaling, indicating whether the UE supports Network Controlled Small Gap (NCSG) interruptions, the message including independent indications of whether the UE supports NCSG for different ones of a plurality of component carriers that are used by a radio of the UE; means for processing signaling from the cellular wireless network indicating when NCSG interruptions are scheduled; and means for performing signal quality measurements based on the scheduled NCSG interruptions.

In example 32, the subject matter of example 31, or any of the preceding examples, further comprising means for controlling transmission of the message, to the wireless network, using Radio Resource Control signaling.

In example 33, the subject matter of example 31, or any of the preceding examples, wherein NCSG interruptions are scheduled at different times on different ones of the plurality of component carriers.

In example 34, the subject matter of example 31, or any of the preceding examples, further comprising: means for performing, during the NCSG interruptions, radio frequency (RF) tuning.

In example 35, the subject matter of example 31, or any of the preceding examples, further comprising means for processing additional signaling, received from the cellular wireless network, indicating a serving frequency and a measurement frequency of cells associated with the cellular wireless network.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 4 and 5, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used.

What is claimed is:

1. A User Equipment (UE), the UE comprising:
    circuitry to interface to a radio circuit, for a cellular wireless network, the radio circuit concurrently implementing a plurality of component carriers for communicating with wireless network;
    one or more processors to:
        generate a message indicating whether the UE supports Network Controlled Small Gap (NCSG) interruptions, the message including:
            an indication of whether the UE supports NCSG on a per-UE basis indicating whether the UE supports NCSG on all component carriers of the UE for the plurality of component carriers;
        process signaling from the cellular wireless network indicating when NCSG interruptions are scheduled for one or more component carriers of the plurality of component carries; and
        perform signal quality measurements based on the scheduled NCSG interruptions.

2. The UE of claim 1, wherein the one or more processors are further to:
    refrain from transmitting or receiving data, for a particular component carrier, of the plurality of component carriers, during a scheduled NCSG interruption.

3. The UE of claim 1, wherein the one or more processors are further to:
    control transmission of the message, to the wireless network, using Radio Resource Control (RRC) signaling.

4. The UE of claim 1, wherein NCSG interruptions are scheduled at different times on different component carriers of the plurality of component carriers.

5. The UE of claim 1, wherein the one or more processors are further to:
    perform, during the NCSG interruptions, radio frequency (RF) tuning.

6. The UE of claim 1, wherein component carriers, of the plurality of component carriers, are associated with different Serving Cells of the wireless network.

7. A method, comprising:
    transmitting a signaling message that indicates whether a user equipment (UE) supports Network Controlled Small Gap (NCSG) interruptions in a cellular wireless network to which the UE is attached, the signaling message including:
        an indication of whether the UE supports NCSG on a per-UE basis indicating whether the UE supports NCSG on all component carriers of the UE;
    processing signaling from the cellular wireless network indicating when NCSG interruptions are scheduled; and
    performing signal quality measurements based on the scheduled NCSG interruptions.

8. The method of claim 7, further comprising:
    refraining from transmitting or receiving data, for a particular component carrier, of a plurality of component carriers, during a scheduled NCSG interruption.

9. The method of claim 7, further comprising:
    controlling transmission of the signaling message, to the cellular wireless network, using Radio Resource Control (RRC) signaling.

10. The method of claim 7, wherein NCSG interruptions are scheduled at different times on different component carriers of a plurality of component carriers.

11. The method of claim 7, further comprising:
    performing, during the NCSG interruptions, radio frequency (RF) tuning.

12. The method of claim 7, further comprising wherein component carriers, of a plurality of component carriers of the UE, are associated with different Serving Cells of the cellular wireless network.

13. The method of claim 7, further comprising:
    processing additional signaling, received from the cellular wireless network, indicating a serving frequency and a measurement frequency of cells associated with the cellular wireless network.

14. The method of claim 13, further comprising:
generating a second message, in response to the additional signaling, indicating UE preferences relating to the NCSG interruptions; and
controlling transmitting of the second message via a radio circuit.

15. A baseband processor for a User Equipment (UE), the baseband processor comprising:
circuitry to interface to a radio circuit, for a cellular wireless network, the radio circuit concurrently implementing a plurality of component carriers for communicating with the cellular wireless network;
one or more processors to:
transmit a UE capability signaling message that indicates whether the UE supports Network Controlled Small Gap (NCSG) interruptions in the cellular wireless network to which the UE is attached, on a per-UE basis indicating whether the UE supports NCSG on all component carriers of the UE;
process signaling from the cellular wireless network indicating when NCSG interruptions are scheduled; and
perform signal quality measurements based on the scheduled NCSG interruptions.

16. The baseband processor of claim 15, wherein the one or more processors is further to:
refrain from transmitting or receiving data, for a particular component carrier, of a plurality of component carriers, during a scheduled NCSG interruption.

17. The baseband processor of claim 15, wherein the one or more processors is further to:
control transmission of the UE capability signaling message, to the cellular wireless network, using Radio Resource Control (RRC) signaling.

18. The baseband processor of claim 15, wherein the one or more processors is further to:
perform, during NCSG interruptions, radio frequency (RF) tuning.

19. A base station, comprising:
one or more processors configured to:
receive, from a user equipment (UE), a message indicating whether the UE supports Network Controlled Small Gap (NCSG) interruptions, the message including: an indication of whether the UE supports NCSG, on a per-UE basis indicating whether the UE supports NCSG on all component carriers of the UE for a plurality of component carriers;
communicate signaling to the UE and based on the message, indicating when NCSG interruptions are scheduled for one or more component carriers of the plurality of component carriers; and
communicate with the UE in accordance with the scheduled NCSG interruptions.

20. The base station of claim 19, wherein the message from the UE involves Radio Resource Control (RRC) signaling.

21. The base station of claim 19, wherein NCSG interruptions are scheduled at different times on different component carriers of the plurality of component carriers.

22. The base station of claim 19, wherein component carriers, of the plurality of component carriers, are associated with different Serving Cells.

* * * * *